No. 738,480. PATENTED SEPT. 8, 1903.
A. POLLAK.
REGISTERING APPARATUS.
APPLICATION FILED JULY 2, 1902.
NO MODEL. 3 SHEETS—SHEET 1.
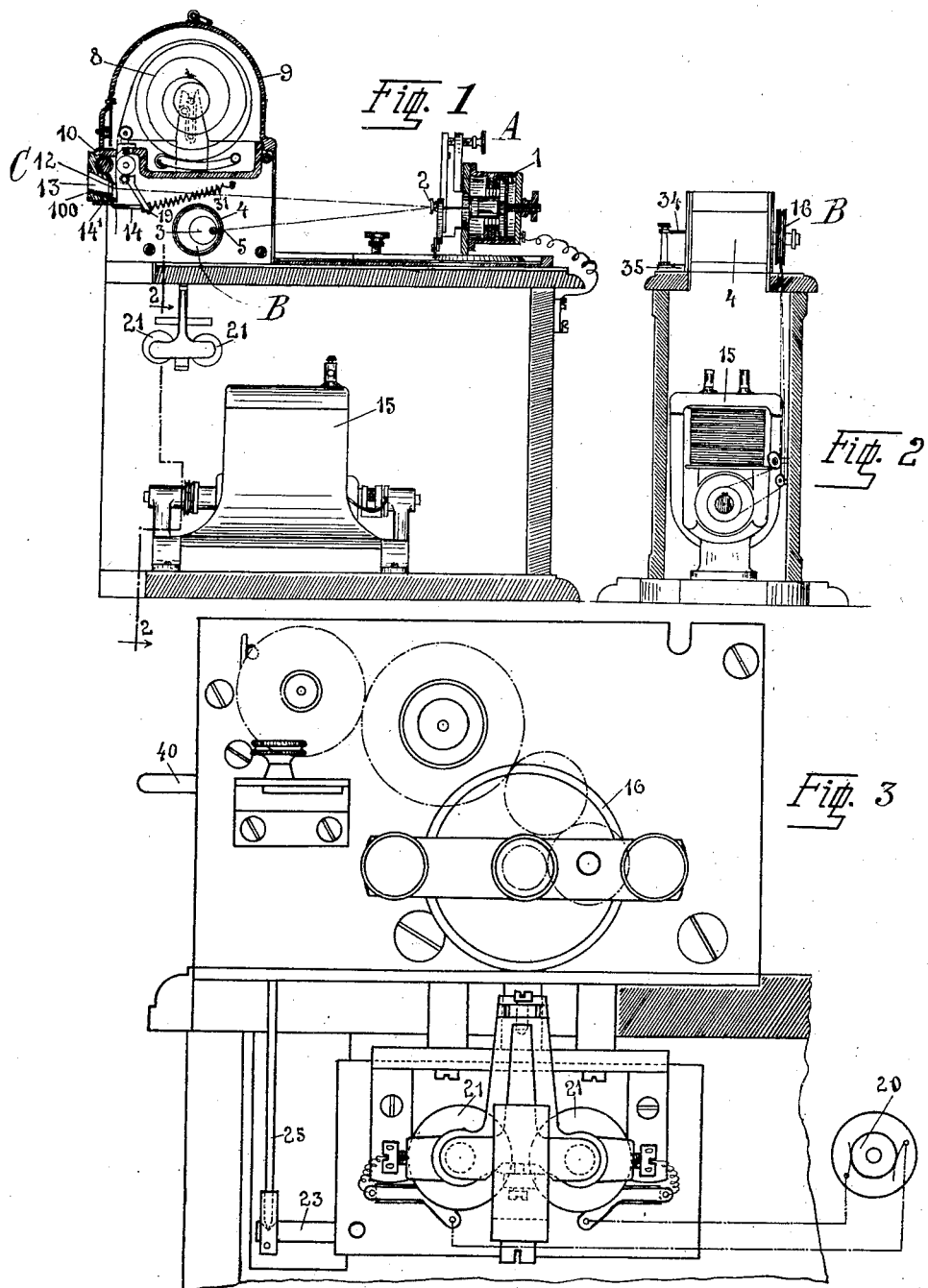
WITNESSES:
Fred White
Domingo N. Alema
INVENTORS:
Anton Pollak,
By Attorneys,

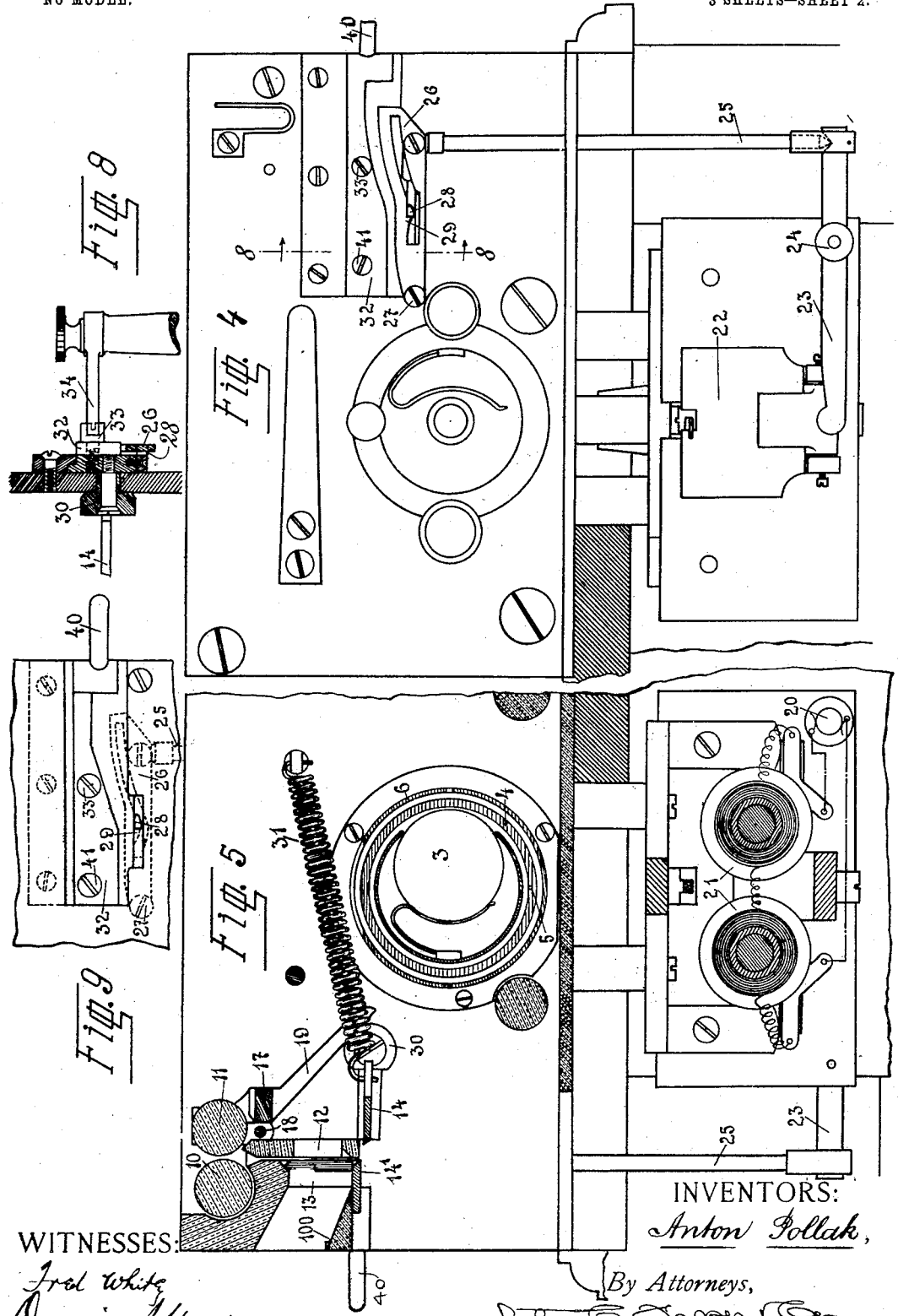

No. 738,480. PATENTED SEPT. 8, 1903.
A. POLLAK.
REGISTERING APPARATUS.
APPLICATION FILED JULY 2, 1902.
NO MODEL. 3 SHEETS—SHEET 3.
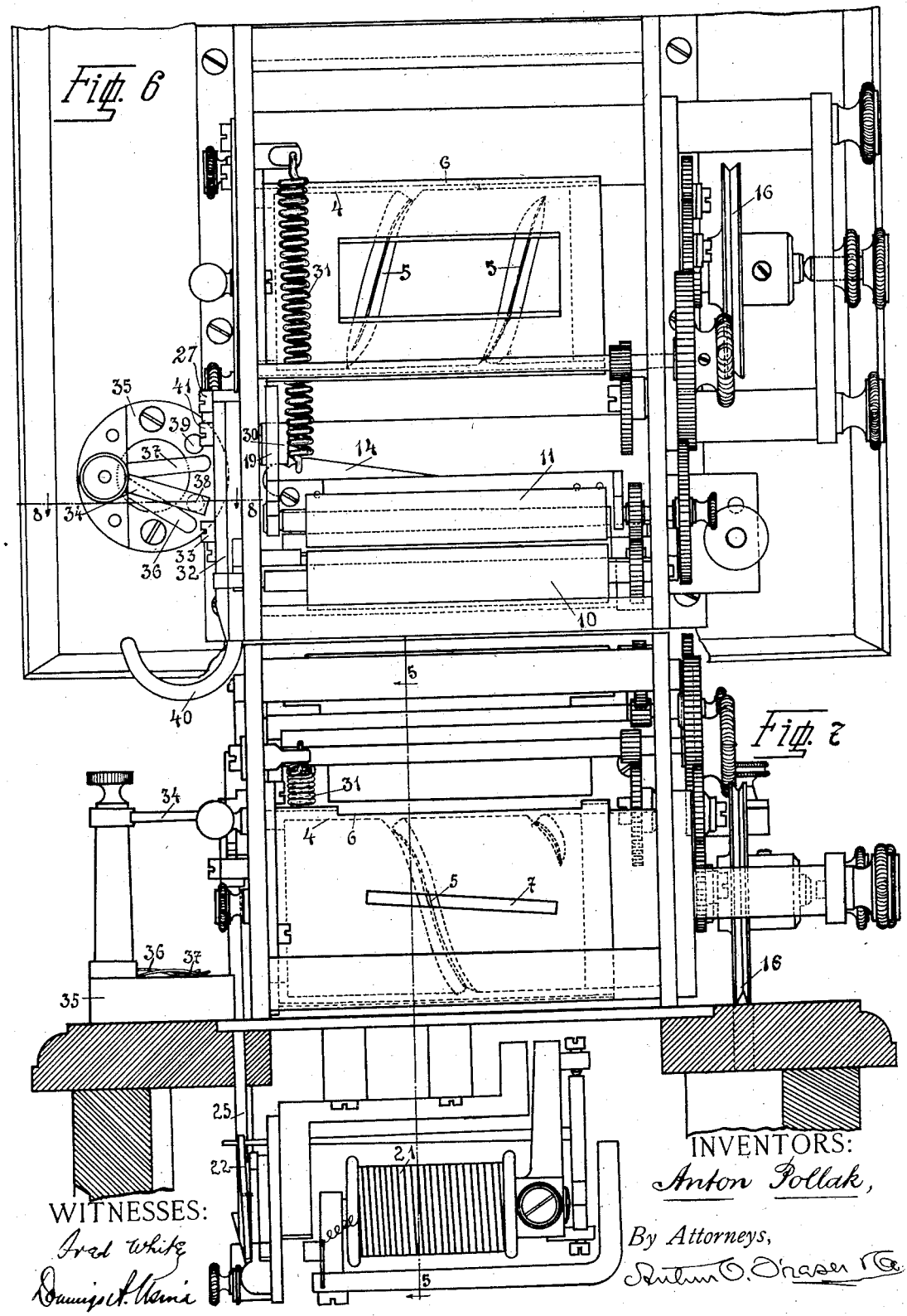
WITNESSES:
INVENTORS: Anton Pollak,
By Attorneys, No. 738,480. Patented September 8, 1903.

UNITED STATES PATENT OFFICE.

ANTON POLLAK, OF BUDAPEST, AUSTRIA-HUNGARY.

REGISTERING APPARATUS.

SPECIFICATION forming part of Letters Patent No. 738,480, dated September 8, 1903.

Application filed July 2, 1902. Serial No. 114,060. (No model.)

*To all whom it may concern:*

Be it known that I, ANTON POLLAK, a subject of the King of Hungary, residing in Budapest, in the Kingdom of Hungary, have invented certain new and useful Improvements in Recording Apparatus, of which the following is a specification.

My invention aims to provide improvements in recording apparatus, and especially in apparatus for photographically recording the movement of a ray of light on a sensitive strip—as, for example, the oscillating movement produced by the indicator described in my Patent No. 653,881, dated July 17, 1900. According to my present invention I am enabled to record the movements of such an indicator in lines arranged one under the other and transverse to the direction of movement of the sensitive strip.

My present invention provides various other improvements in detail, as hereinafter specified.

An embodiment of the invention is shown in the accompanying drawings, in which—

Figure 1 is a schematic view, partly in elevation and partly in section, of the complete apparatus. Fig. 2 is a section on the line 2 2 of Fig. 1. Fig. 3 is a side view of the recording apparatus. Fig. 4 is a side view of the same from the opposite direction. Fig. 5 is a vertical section of the recording apparatus on the line 5 5 of Fig. 7. Fig. 6 is a plan of the recording apparatus. Fig 7 is a front elevation of the same. Fig. 8 is a detail in section on the line 8 8 of Figs. 4 and 6. Fig. 9 is a portion of Fig. 4 with the part 26 shown only in dotted lines.

In the patent of myself and J. Virag, No. 675,496, dated June 4, 1901, there are described means of forming closed characters by rays of light moved in two planes at an angle to each other, the rays being deflected either by two different mirrors acting in succession on the ray or by a single mirror adapted for producing either of the movements or any combination thereof.

In my above-mentioned patent, No. 653,881, I have described an apparatus which I call an "indicator," in which a small mirror is given an oscillating movement corresponding to the electrical impulses sent over a line of electric communication. My present recording apparatus is shown in connection with said indicator; but it is in many respects equally adapted to various other types of indicators employing either mirrors or lenses and employing any means whatever of moving the light-deflecting element in a desired way to form complete characters whether open or closed.

An important feature of my present invention is that the ray of light projected to the indicator from the original source of light is projected from a moving point, whereby the movements of the ray from the indicator may be recorded in successive lines like an ordinary written page without the interposition of any light-deflecting means between the indicator and the sensitive strip upon which the movement of the ray from the indicator is recorded. For example, the two mirrors of Patent No. 675,496, and the one mirror having a double movement, each constitute a particular type of indicator to which the light would be projected from a point moving along in a line to produce a line of closed characters. Preferably the indicator moves the ray of light projected on it by an oscillating movement in a plane producing vertical lines of the characters to be recorded, and the point from which the ray is projected onto the indicator moves in a plane at an angle (approximately a right angle) to the first-mentioned plane, thus arranging the characters in horizontal lines. For securing the movement of the point from which the ray is projected to the indicator I preferably use a cylindrical screen having a spiral slit, in the rear of which is any suitable source of light, direct or indirect. As the cylindrical screen is rotated the point or portion of the slit from which light is projected toward the indicator moves in a direction parallel to the axis of the screen. To secure the desired angle between the plane of oscillation of the indicator and the direction of movement of the ray projected on the indicator, it is only necessary to arrange the axis of this rotating screen at right angles to the plane of oscillation of the indicator. Preferably a pair of screens are used having slits crossing each other at an oblique angle (one of which screens may be a cylindrical screen, as described) and by a relative movement of which a desired movement of the aperture formed at the point of intersection of the slits is obtained.

My invention also provides important features of novelty besides those in the light-projecting apparatus. An important feature is the combination of a receptacle or dark chamber for the sensitive strip, which is connected to a narrow passage forming a light-chamber, through which the strip is drawn and in its passage through which it is exposed to the ray from the indicator. Preferably also an observation-window is provided in the light-chamber, by which the operator can observe the movement of the recording ray of light and observe when a message is finished. Preferably also means are provided for drawing the strip through the slit and for cutting off that portion of a strip which contains a completed message after it has passed through the light-chamber. Preferably also an annunciator is provided to indicate the beginning of a message, and on the operation of the annunciator the record-making mechanism, as well as the strip-feeding mechanism, are automatically set in operation. For convenience I may provide also means for simultaneously rendering the feeding and record-making mechanisms inoperative, and preferably also for simultaneously operating the cutter. Preferably also the stopping of the feeding and record-making operations is accompanied by a simultaneous restoration of the annunciator to its normal position.

Referring now to the drawings, A indicates as a whole the indicator; B, the means for projecting light thereon, and C the feeding mechanism, Figures 1 and 2. The parts A and B taken together constitute a mechanism for making a record upon the strip fed through the feeding mechanism C. The indicator shown includes an apparatus 1, similar to a telephone, and a mirror 2, connected to the membrane of the apparatus 1 in such a way as to give a desired movement (preferably an oscillating movement) to the mirror, which movement is to be registered. The source of light may be a stationay incandescent lamp 3, which is within a hollow rotating cylinder 4, through the wall of which is a narrow slit 5 in the form of a complete or slightly more than a complete spiral. Preferably I arrange in front of this cylindrical screen another screen in the form of a diaphragm 6, having a slit 7, Fig. 7, therethrough, through which rays of light from a point of the spiral slit in the cylinder are projected to the mirror 2. The combination of the two screens with the slits crossing each other forms at their crossing substantially a single point from which the light is projected. This point for each rotation of the cylinder moves once from right to left, (or in the opposite direction, as desired.) The use of the rotating screen has therefore the same effect as if a source of light were itself moved from left to right or right to left, the area of the source of light being reduced to substantially a single point by the interposed diaphragm 6. The area of the aperture formed at the crossing of the two slits 5 and 7, however, may be of any desired magnitude, the mirror 2 being preferably concave, so as to focus the light reflected to the recording-strip to substantially a point. The light reflected from the mirror—that is to say, the point of light which is projected on the photosensitive strip 8—accordingly moves from left to right (or in the opposite direction) over the strip. As soon as the cylindrical screen has made a complete rotation the starting-point of the spiral slit is again interposed between the lamp and the mirror and the operation commences anew. Since the sensitive strip has in the meanwhile received a desired movement longitudinally, the next line of the record begins at a determined distance from the previous line. It is preferred to move the recording-strip continuously, and this movement, if the recorded line were formed horizontally, would result in the formation of an oblique line across the strip. In order to rectify this obliquity, the slit 7 of the diaphragm 6 and preferably also the lamp are arranged at a suitable inclination, as shown. The roll of sensitive paper 8 is carried in a receptacle or box 9, which is substantially light-proof and is unrolled and drawn out by means of the rollers 10 and 11, Fig. 5, which are operated by means hereinafter described on the outside of the apparatus. From the receptacle or dark chamber the strip is drawn through a narrow passage, in which it is exposed through the opening 12 to the rays of light from the mirror. This passage is closed at the back by an observation-window 13, formed, preferably, of red glass, through which the movement of the ray of light over the sensitive strip may be observed. Preferably, also, an angular mirror 100 is arranged in position to make observation easier. Below the exposing-passage is a cutter, preferably comprising a pair of shear-blades 14 14', the latter stationary and the former movable, by means of which the sensitive strip upon which a message has been recorded may be cut off after the completion of the message. The various movable parts of the apparatus may be driven by means of a motor 15, Figs. 1 and 2, connected by a belt to the pulley 16 on the cylinder 4, which in turn is connected by toothed pinions to the means for feeding the sensitive strip, Figs. 6 and 7. The rollers 10 and 11, which accomplish the feeding of the strip, are normally in continuous rotation, but when the apparatus is not in use the rollers are separated from each other such a distance that they do not grip the sensitive strip, so as to unroll the same. This operation is obtained by mounting the roller 11, Fig. 5, in a support 17, which swings about a shaft 18 and is moved and held out of contact with the roller 10 by the weight of the arm 19, which latter moves downward when permitted, as hereinafter explained. Preferably the cutting of the indicator A into the circuit and the bringing together of the rollers 10 and 11 (for the purpose of unrolling the sensitive strip) and preferably also the cutting of the incandescent lamp 3 into the circuit are controlled by an annunciator. This annunciator may receive current from any suitable source 20 and includes a magnet 21 and clapper 22, normally held in the upper position shown in Fig. 4 and arranged to drop when a signal calling the operator is given. The clapper drops on one end of the lever 23, pivoted at 24, pressing down this end of the lever and pressing upward the other end, upon which is a rod 25, which at its upper end presses against a lever 26 and swings the same upward a short distance about its pivotal point 27. The stop 29, carried on the lever 26, is then raised to free a pawl 28, Figs. 4, 8, and 9, on the lower edge of a slide 32. Within the casing, Fig. 6, is a spring 31, attached to the free end of the shear-blade 14 and tending to pull the same inward, which free end bears against a disk or similarly-shaped member 30, connected through the side wall of the casing with the slide 32. Therefore when the slide 32 is released by the lifting of the lever 26 the slide is drawn in an inward direction. The member 30 bears on the under side of the arm 19, so as when drawn inward to lift this arm and press the roller 11 against the roller 10. By the same inward movement of the slide the stop 33 operates the electric switch by striking the arm 34, Figs. 6 and 7, so as to rotate the vertical shaft, which carries at its lower end spring terminals 36 and 37, which are thus moved to positions over the fixed terminals 38 and 39 in the switch 35, thus closing the previously-opened circuits, which by any suitable connections (not shown) connects the source of current to the indicator and the lamp and preferably to the other apparatus. The pressing of the roller 11 against the roller 10 causes the feeding of the strip, and therefore the entire apparatus is now in operation. As soon as the operator observes through the observation-window 13 that the movement of the mirror 2 has ceased he may stop the entire apparatus by a single movement, simultaneously rendering the feeding and record-making mechanism inoperative and preferably also cutting off the finished portion of the strip. Preferably, also, by this same movement he restores the annunciator to its original position. For this purpose the slide 32 is provided with a handle 40, by the pulling of which outward the several operations stated are controlled. The stop 41 on the slide 32 engages the arm 34 of the switch 35 and moves the same outward to a circuit-breaking position, in which the terminals 36 and 37 are off the terminals 38 and 39 and the current to the indicator, lamp, &c., is broken. At the same time the member 30, which is connected to the slide, presses outward, against the action of the spring 31, the blade 14 of the shears against the stationary blade 14', so as to cut off the desired portion of the sensitive strip between them. The arm 19 of the support 17 of the roller 11 is allowed to fall, so as to separate the rollers 11 and 10 and render them inoperative to continue the feeding action. The continued outward movement of the slide 32 causes the pawl 28, moving in the curved slot of the lever 26, Fig. 4, to press down this lever and to press up to its original position the armature 22 of the annunciator. Upon then releasing the handle 40 the spring 31 draws the slide inward until the pawl 28 engages the stop 29, which prevents the restarting of the several devices.

Though I have described with great particularity of detail an apparatus embodying all the features of improvement introduced by my invention, yet it is to be understood that the invention is not limited to the specific embodiment disclosed.

Various modifications of the details and combinations shown are possible to those skilled in the art without departure from the invention.

What I claim is—

1. The combination with an indicator for forming complete characters by suitably moving a ray of light projected thereon, of means for projecting a ray thereon from a point moving along continuously in a line to form a line of such characters.

2. The combination with an indicator for forming complete characters by suitably moving in a plane to produce said characters a ray of light projected thereon, of means for projecting a ray of light thereon from a point moving along continuously in a plane at an angle to said first-mentioned plane to form a line of such characters.

3. The combination with an indicator for moving a ray of light projected thereon, of means for projecting a ray thereon from a moving point including a cylindrical screen having a spiral slit and a second screen having a slit extending axially of said cylindrical screen whereby the point from which light is projected toward said indicator moves axially of the screen as the latter is rotated.

4. The combination with an oscillating mirror, of means for projecting a ray thereon from a moving point including a cylindrical screen having its axis at an angle with a plane of oscillation of said mirror and having a spiral slit and a second screen having a slit extending axially of said cylindrical screen whereby the point from which light is projected toward said mirror moves angularly to said plane of oscillation as the screen is rotated.

5. The combination with an indicator for moving a ray of light projected thereon, of means for projecting a ray thereon from a moving point comprising a pair of screens having slits crossing each other at an oblique angle, and means for producing a relative movement of said screens to cause a movement of the aperture at their point of intersection.

6. The combination with an indicator for moving a ray of light projected thereon, of means for projecting a ray thereon from a moving point comprising a pair of screens having slits crossing each other at an oblique angle, one of said screens being cylindrical and its slit being spiral, whereby the point from which light is projected toward said indicator moves axially of the cylindrical screen as the latter is rotated.

7. In a photographic recording apparatus, the combination with a dark-chamber for receiving a sensitive strip, of a narrow passage through which said strip may be drawn and which has an opening through which said strip may be exposed, means for projecting a moving ray of light through said opening, and an observation-window through which the movement of said ray of light may be observed.

8. In a photographic recording apparatus, the combination with a dark-chamber for receiving a sensitive strip, of an exposing-passage through which said strip may be drawn and in which said strip may be exposed, means for making a record on said strip as it is exposed, and means located immediately at the outer end of said passage for cutting said strip immediately after it passes through said passage and while the immediately-succeeding portion of the film lies in said passage in position for exposure.

9. In a recording apparatus, the combination with mechanism for feeding a recording-strip, of mechanism for making a record thereon in response to suitable electrical impulses, means rendering said mechanism inoperative to respond to said impulses, an annunciator, and means for starting said feeding mechanism and rendering said record-making mechanism operative to respond to said impulses on the operation of said annunciator.

10. In a recording apparatus, the combination with mechanism for feeding a recording-strip, of mechanism for making a record thereon in response to suitable electrical impulses, and means for simultaneously rendering said feeding and record-making mechanisms inoperative so that the latter does not respond to said impulses.

11. In a recording apparatus, the combination with mechanism for feeding a recording-strip, of simultaneously-operating mechanism for making a record thereon, a cutter for cutting off a portion of said strip, and means for simultaneously rendering said feeding and record-making mechanisms inoperative and operating said cutter.

12. In a recording apparatus, the combination with mechanism for feeding a recording-strip, of mechanism for making a record thereon in response to suitable electrical impulses, means rendering said mechanism inoperative to respond to said impulses, an annunciator, means for starting said feeding mechanism and rendering said record-making mechanism operative to respond to said impulses on the operation of said annunciator, and means for simultaneously rendering said feeding and record-making mechanisms inoperative and restoring said annunciator to its normal position.

13. In a recording apparatus, the combination with mechanism for feeding a recording-strip, of mechanism for making a record thereon in response to suitable electrical impulses, a spring tending normally to retain said mechanisms in operative positions, a stop for restraining said spring to hold said mechanisms inoperative, and means for withdrawing said stop.

14. In a recording apparatus, the combination of a pair of rollers adapted to engage a recording-strip between them, means for rotating said rollers to feed said strip, means for making a record on said strip as it is fed, and means for separating said rollers to render them inoperative.

15. An exposing-chamber for a sensitive strip, having an aperture through which said strip may be exposed, means for making a record on said strip as it is exposed, and an observation-window immediately opposite said aperture.

16. In a record-making mechanism, means for projecting a ray of light from a moving point, including a cylindrical screen having a spiral slit, a second screen having a slit extending axially of said cylindrical screen, and a lamp arranged to project light through said slit whereby the point from which light is projected in a given direction moves axially of the screen as the latter is rotated.

17. In a record-making machine, the combination with an indicator for moving in a given plane a ray of light projected thereon so as to produce individual characters, of means for projecting a ray thereon from a point moving at an angle to said plane so as to arrange said characters in a line, said projecting means comprising a pair of screens having slits crossing each other at an oblique angle, means for producing a relative movement of said screens to cause a movement of the aperture at their point of intersection in a direction at an angle to said plane, and a lamp arranged to project light through said aperture.

18. In a record-making machine, means for projecting a ray of light from a moving point, comprising in combination a pair of screens having slits crossing each other at an oblique angle, one of said screens being cylindrical and its slit being spiral, and a lamp arranged to project light through said slits whereby the point from which light is projected through both said slits moves axially of said cylindrical screen as the latter is rotated.

In witness whereof I have hereunto signed my name in the presence of two subscribing witnesses.

ANTON POLLAK.

Witnesses:
FRANK DYER CHESTER,
KELEMEN ANDREAS.